United States Patent [19]

McWhorter

[11] Patent Number: 5,644,511

[45] Date of Patent: Jul. 1, 1997

[54] CYCLOMETER COMPUTER

[76] Inventor: Gary T. McWhorter, State Rte. 1, No. 194, Jacksons Mill, W. Va. 26452

[21] Appl. No.: 429,156

[22] Filed: Apr. 26, 1995

[51] Int. Cl.$^6$ ................................................ G01C 22/00
[52] U.S. Cl. .......................... 364/565; 364/551.01; 474/69
[58] Field of Search .............................. 364/551.01, 565, 364/566, 561, 571.01, 571.02, 571.07, 575; 474/69, 70, 71, 103, 110

[56] References Cited

U.S. PATENT DOCUMENTS

| 4,642,606 | 2/1987 | Tsuyama | 340/134 |
|---|---|---|---|
| 4,862,395 | 8/1989 | Fey et al. | 364/561 |
| 5,059,158 | 10/1991 | Bellio et al. | 474/70 |
| 5,213,548 | 5/1993 | Colbert et al. | 474/71 |
| 5,261,858 | 11/1993 | Browning | 474/69 |
| 5,335,188 | 8/1994 | Brisson | 364/551.01 |
| 5,356,348 | 10/1994 | Bellio et al. | 474/40 |

OTHER PUBLICATIONS

Bicycling Magazine, Dec. 1994, p. 46. no author.

Primary Examiner—Emanuel T. Voeltz
Assistant Examiner—M. Kemper
Attorney, Agent, or Firm—Richard C. Litman

[57] ABSTRACT

A cyclometer computer display unit for providing an on-board computer to display real-time instructions to the cyclist. The computer has a central display mounted on a handlebar bracket. Sensors mounted to the front wheel detect the current wheel rotation velocity of the bicycle. Stored data in the computer including the wheel diameter, and gear ratios, and a maximum and minimum effective cadence range are used to calculate theoretical cadences (pedal rpms) for each gear for the cyclist. Certain theoretical cadences are displayed along with various gear ratios to coach the cyclist on which gears would place the cyclist in a cadence within the desired cadence range. Optional shifter position sensors, derailleur position sensors, or crankarm rotation sensors can be used to determine and display the actual cadence and current gear. A calculation element of the computer determines the difference between the actual cadence (when available) and the center of the desired cadence range and displays the difference on the display. An out of range alarm beeps when the cadence is above or below the range. A single or double bracket converter permits mounting of two of the units or one of the units and a prior art computer on an existing cyclometer mounting bracket. A scrolling feature permits user-controlled display of a first limited number (e.g., three) of columnar arranged data, which might be six or more in number, and the ability to scroll through the remaining data at will.

20 Claims, 9 Drawing Sheets

CYCLOMETER COMPUTER

BACKGROUND OF THE INVENTION

1. Field of the Invention

The present invention relates to an improved multi-function cycling computer.

2. Description of the Prior Art

As computers become smaller and less expensive, the possible applications for compact computers continue to expand. One such application which has found favor with computers is the sports industry. The merging of the sports and fitness industry with the computer technology has produced a wealth of useful information on the athlete's ongoing output and biological conditioning. Through performance monitoring and trainers, individual athletes gain the ability to modify training output levels according to real-time feedback.

One such computerized device is shown in U.S. Pat. No. 4,862,395 issued to Fey et al. on Aug. 29, 1989. The bicycle data display instrument shown uses a pedal rotation sensor and a wheel rotation sensor to calculate and simultaneously display both the current speed and actual cadence (pedal rpms) of the rider. Other data displayable include historical data such as average speed and travelling time.

Another data display unit is shown in U.S. Pat. No. 4,642,606 issued to Tsuyama on Feb. 10, 1987. The data display unit uses a magnetic pickup and sensor mounted to the pedal crank arm and another to the front wheel of the bicycle to calculate speed and actual cadence. A liquid crystal display shows the: maximum speed, average speed, and actual cadence of the rider.

U.S. Pat. No. 5,335,188 issued to Brisson on Aug. 2, 1994, shows a performance comparator and display means connected to a bicycle. The comparator senses performance data which can be stored by the user for retrieval later as historical performance data. The historical performance data can be displayed adjacent: the current performance data on the computer display to show relative improvement of the user over the historical performance.

As a further use of computers in the bicycling area, an electro-mechanical system for manually or automatically shifting gears on a bicycle is the subject of U.S. Pat. No. 5,059,158 issued to Bellio et al. on Oct. 22, 1991. In an automatic model, a central processor receives actual cadence input and compares the current shifter position and gear ratio to a stored database representing the different gear ratios available on the bicycle. The computer compares the current cadence to pre-stored cadence limits and when necessary shifts the derailleur of the bicycle to achieve a gear ratio which will bring the cadence within the cadence limits.

The Bellio et al. patent further shows a computer mode where the computer calculates the cadence from the speed and a derailleur or shifter position sensor. The cadence is then compared to the pre-stored cadence limits and displays an up or down arrow to signal the rider to shift up or down.

None of the above inventions and patents, taken either singly or in combination, is seen to describe the instant invention as claimed.

SUMMARY OF THE INVENTION

The current invention provides a novel approach to providing an on-board computer coach to provide real-time instructions to the rider. Variables such as cadence, heart rate, breathing rate, and speed can be used to monitor the effectiveness of ongoing training sessions, races, etc. And as cycling coaches and sports health specialists gather information on cycling techniques, various training methods and bio-feedback checkpoints continue to be identified and proven effective.

The effectiveness of the training device and the willingness of cyclists to implement the different instruments depend in great part on the effort and expense involved in equipping and using the device. If the weight of the device, installation time, or its cost are perceived to outweigh or in great part negate the value of the instrument, then the user will be reticent to employ the device, irrespective of the potential benefit of the computer.

A cyclometer computer according to the present invention provides the rider with significant information about the current performance of the rider and offers instantaneous suggestions about how the rider can improve his current riding output. The simplicity of the device to install, the reduced sensors, and equipment necessary to drive the full function computer greatly add to the usability of the device.

The computer has a central display mounted on a handlebar bracket. A single sensor mounted to the front wheel detects the current wheel rotation of the bicycle. Stored data in the computer including the diameter of the wheel, and the front and rear gear sizes (i.e., teeth count) are used to determine the current speed of the bicycle and theoretical cadence for each gear at the current speed.

The display shows the theoretical cadence for three gears which will produce a cadence within pre-stored cadence limits. An arrow or other indicator denotes whether additional gears are available which also produce the desired cadence. The rider then can choose gears recommended by the computer to place his cadence within the limits calibrated or preset by the user.

Function and mode buttons provided on the computer also control separate outputs on the display, including stop and start for the timing functions on the computer. The mode button controls scrolling of historical and current performance data on the computer display including max speed, odometer, trip distance, elapsed time, average speed, current time of the day, and gears/cadences.

Optionally, sensors can be provided on the computer which sense the gears through attachment to the shifters or derailleur cables to sense the exact gear combination and thus the gear ratio currently being ridden. With this information, the computer can prompt the rider to shift up or down, and inform the rider of the current cadence for the exact gear being employed.

Optionally, a sensor can be mounted to the chainstay to sense motion of the crankarm to detect actual cadence. A cadence alarm can then be sounded when the rider has a cadence outside a user pre-set effective cadence maximum and minimum. Also the computer can display the difference between the rider's current rpms and the average of the effective cadence maximum and minimum.

Mounting of the computer to an existing mounting bracket and sensor is simplified by the use of a converter bracket which mounts between the existing bracket and the cyclometer. A dual converter bracket can also be used to mount the cyclometer along with the existing computer or beside a second computer according to the present invention.

Accordingly, it is a principal object of the invention to provide a cyclometer computer which has a simplified mounting process which displays a theoretical cadence derived from the wheel speed.

It is another object of the invention to supply a cyclist with enhanced current performance data in the form of theoretical cadence for various gear combinations available on the bicycle.

It is a further object of the invention to provide a simplified upgrade kit including a bracket which allows a computer according to the current invention to be installed on an existing computer mounting bracket.

Still another object of the invention is to provide a dual converter bracket which can be installed on the handlebar or stem of a bicycle to allow a plurality of computers to be mounted side by side providing the rider with enhanced performance data.

It is a further object of the invention to provide a cable or shifter mounted sensor which senses and records the current shifter or derailleur position, and transmits the data to the display so that the actual cadence of the rider can be displayed.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
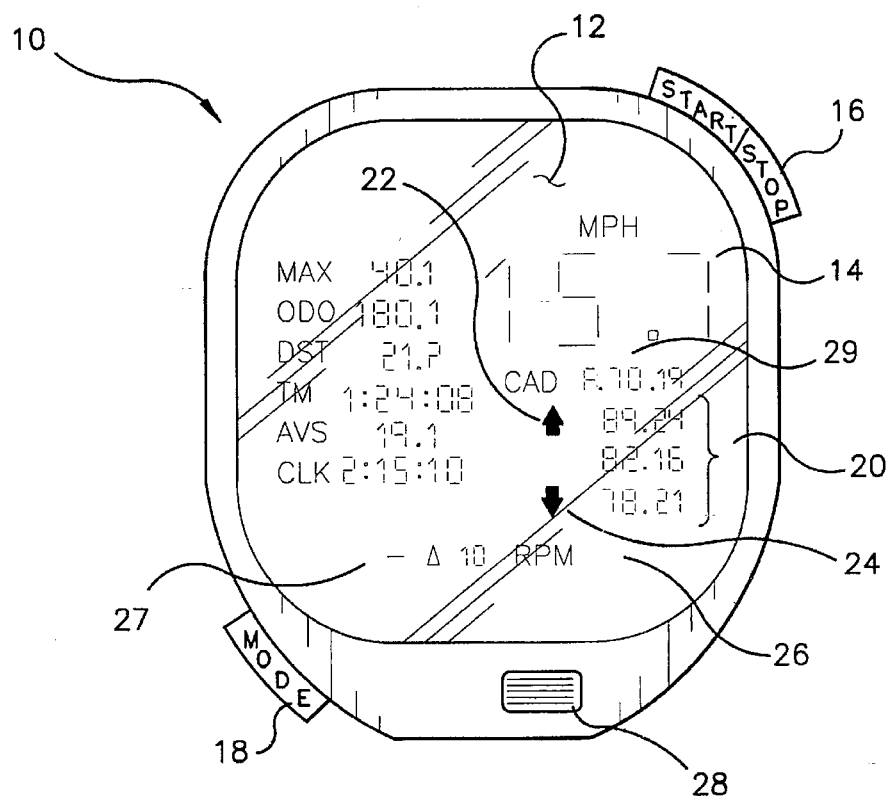
FIG. 1 is a top plan view of the cyclometer computer and display face with all of the various display elements shown.

The present invention is an improved bicycle computer training coach and mounting device. Referring to the drawings a more detailed description of the invention will be made.

Figure 10:
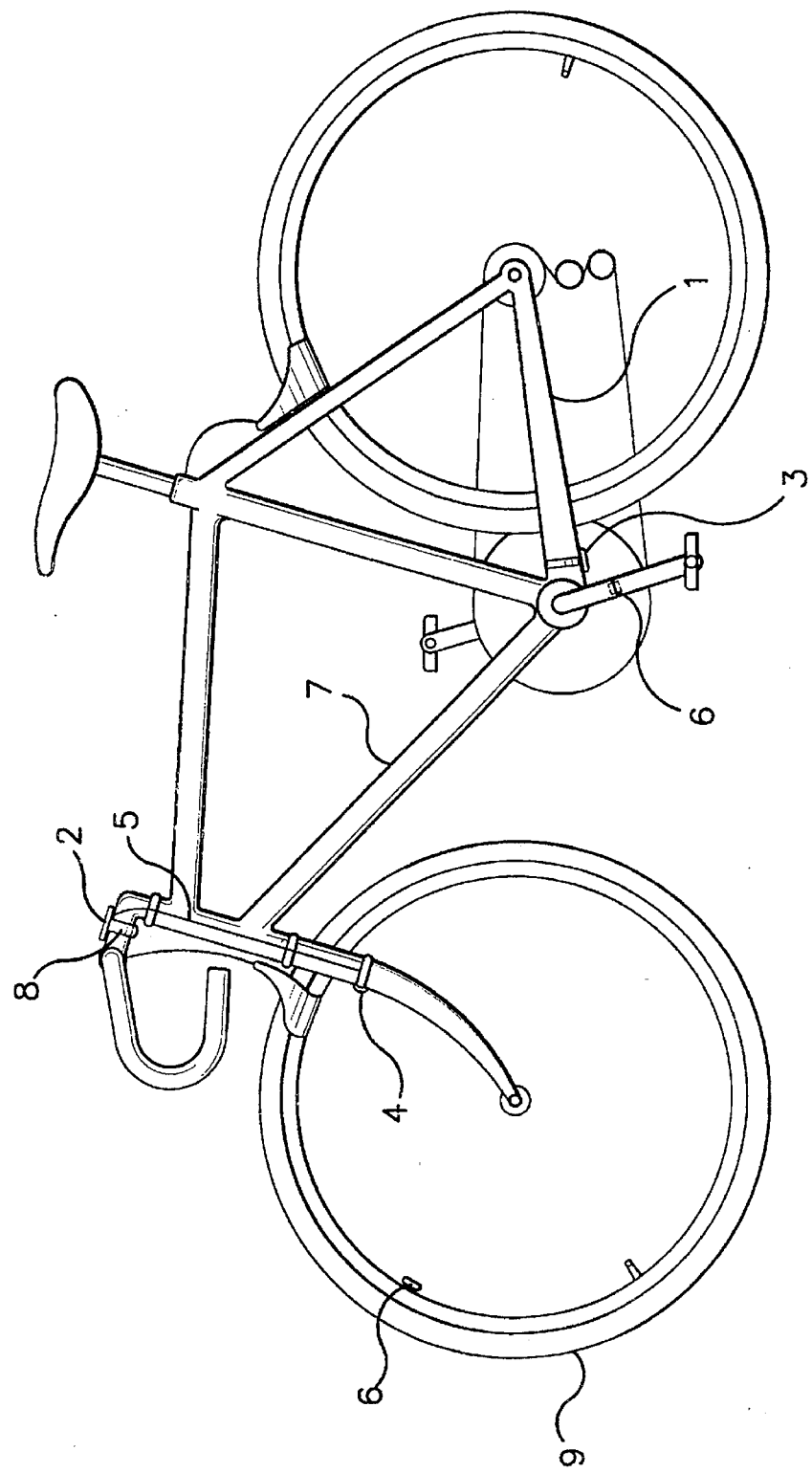
FIG. 10 shows a side elevation view of a prior art bicycle computer with a wheel sensor and a cadence sensor.

FIG. 10 shows a prior art computer 2 mounted to a bicycle. The computer 2 is in communication with a sensor 4 which sends a pulse to the computer 2 through cable 5 each time a magnet 6 mounted to the wheel 9 passes in close proximity to the sensor 4. The electrical pulses initiated by the sensor are counted and timed by the computer to estimate theoretical present speed of the bicycle. A cadence sensor 3 mounted to the chainstay 1 of the bicycle frame detects each revolution of a magnet 6 mounted to the crankarm and sends an electrical signal through cable 7 to the computer 2. The computer then calculates the actual cadence by timing the period between successive electrical signals from the sensor 3.

An LCD display on the bicycle displays the current bicycle speed and distance ridden. The rider can use this information to gauge the approximate time that the current trip or race will take to finish.

FIG. 1 shows a cyclometer computer display module 10 according to the present invention with enhanced performance display information. The face 12 of the cyclometer 10 is an LCD screen displaying information about the user's current and historical performance to provide the user with enhanced data about his current performance. While FIG. 1 shows all of the information available to be displayed, it is preferred that only some of the information appears at any one time to prevent information overload on the rider, as will be discussed below.

According to the first embodiment of the invention, the computer is in communication with a sensor (not shown) mounted on the front fork which counts revolutions of the front wheel in the manner discussed above with reference to FIG. 10. The time between electrical pulses from the sensor is calculated and compared to stored wheel calibration information to estimate the current theoretical speed of the bicycle, where Speed=k * [Wheel Circumference/Time Interval]

Wheel Circumference is a measured constant, stored in memory;

Time Interval is the time between adjacent pulses, or the time for the wheel to make one complete revolution;

and k=3600/63,360, the conversion factor between inches per second and revolutions per minute (rpm) when the circumference is in inches, and the time interval is in seconds.

The current speed 14 is then displayed on the computer face informing the rider of his current performance. Preferably this information is always displayed when the bicycle is in motion, i.e. non-scrolled. The data is also used to determine the wheel revolutions per minute (rpm) which is stored for later use.

In a like manner, a trip timer is initiated by the start/stop button 16 to provide a frame of reference for additional calculations. The results of these additional calculations are displayed on the left side of the computer face, and are preferably displayed in groups of three at a time. The max speed (MAX), odometer (ODO), trip distance (DST), elapsed time (TM), average speed (AVS), and time of day (CLK) can be displayed for the rider's benefit. Initially the max speed, odometer, and distance are displayed, but by depressing the MODE button 18, the display can be caused to shift once (scrolled down) to display the odometer, trip distance, and elapsed time. This process is repeated until the bottom three values, time of day, average speed, and elapsed time, are displayed.

A separate set of calculated data is displayed below the current speed 14 relating to the actual or theoretical cadence of the rider. Depressing the MODE button while the time of day, average speed, and elapsed time are displayed transfers the scroll from the distance/speed display calculations to the gear/cadence calculations. The user can then scroll through available gear/cadence data, as will be discussed below, by depressing the start-stop button. Likewise, continuing to depress the MODE button will cause the display to "roll over" to display the max speed, odometer, and trip distance and so forth. One skilled in the art would also appreciate that a separate button could be used to cause scrolling of the gear/cadence data.

Figure 2:
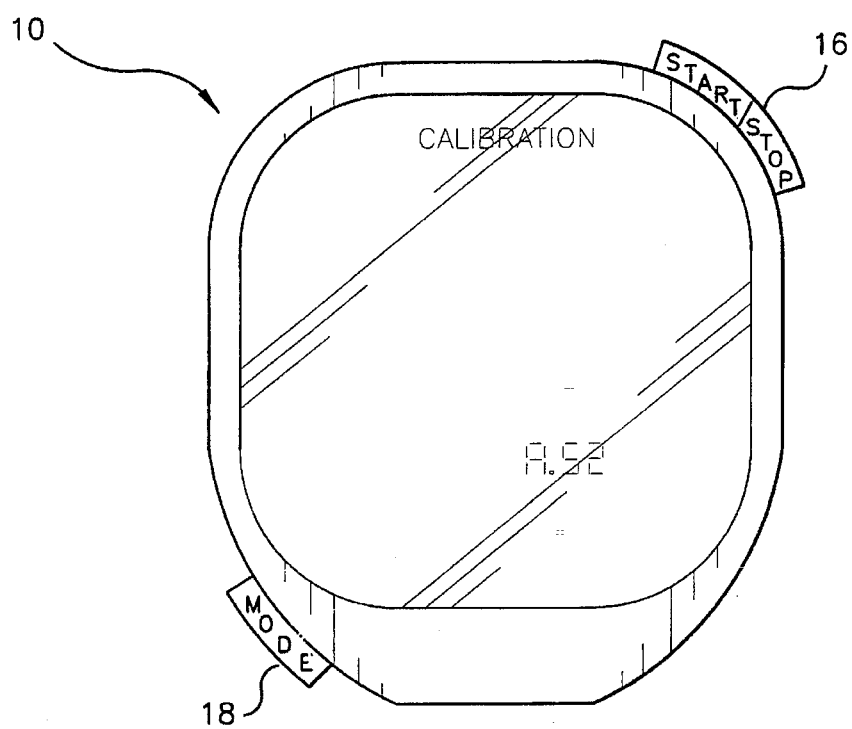
FIG. 2 is a top plan view of the cyclometer computer and display face in a calibration mode.
Figure 3:
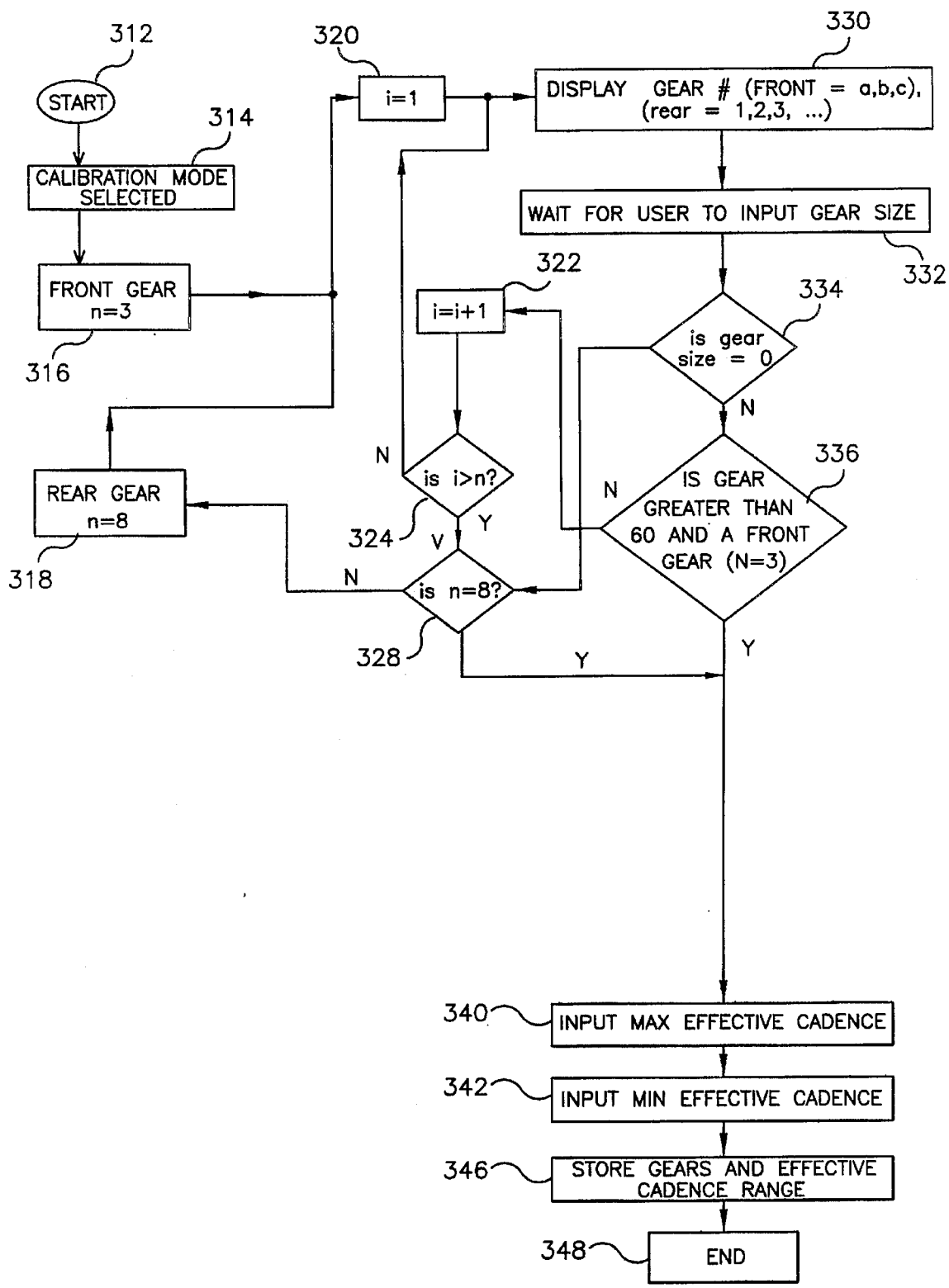
FIG. 3 is a flow diagram showing the iterations involved during calibration of the cyclometer computer.

In order for the computer to calculate the cadence, the user must calibrate the computer for the bicycle. FIGS. 2 and 3 illustrate the manner in which the computer is calibrated.

The calibration mode is entered each time the power supply is reset, typically during insertion of a new battery into the computer, but could be initiated by a number of means, including shorting across the positive and negative leads of the computer (not shown), or other well known methods. When the computer display is in the calibration mode, the screen shown in FIG. 2 is displayed to the rider. "Calibration" appears at the top of the screen, and "A0.53" appears near the bottom right of the screen, representing the first gear to be set (the first front chainring) and the default value for that gear. While one skilled in the art would recognize that the calibration process could be performed by entering gear ratios into the computer rather than individual gear sizes, it is preferable to enter the individual gears to reduce the amount of calculations which must be performed by the user.

Beginning at step 312 of the flow diagram of FIG. 3, the process for entering the Front and Rear Gears of the bicycle into the computer is commenced. Proceeding to step 316, the register "n" is set to three representing the three possible front chainrings that may be present on the bicycle. Register "i" is then set to 1 in step 320, representing the first chainring of the bicycle to be entered. Proceeding to step 330, the current gear being entered into the computer is displayed.

The computer retrieves the value of n and i to determine the current gear. If n=3, then a front gear is being entered into the computer; otherwise a rear gear is being entered. If i=1, then the first largest gear is being entered, etc. The front chainrings are assigned arbitrary names A, B, and C, and the rear gears are assigned 1-8. Gears which are not present will be assigned the value of 0, as will be discussed below. An initial default value is also displayed with the gear, which value can be increased or decreased to match the value of the gear. Initially, the first gear "A" is displayed along with the value 53 as the default value for the largest front chainring. The user depresses the start/stop button in step 332 to decrease the value until the number of teeth on the respective chainring is shown. When the value reaches 0, depressing the start/stop button will cause the value to "roll over" to 150. One skilled in the art would recognize that other scrolling methods could be used to set the gears, such as holding in the start/stop button to reverse the scrolling direction, etc.

The value for the chainring is entered into the computer's registers by depressing the MODE button. A zero is entered if the respective gear being entered on the computer does not exist. For example, if the bicycle has two front chainrings, then 0 is entered for the third chainring value.

The entered value is then compared to zero in step 334. If the gear is not equal to zero, then the computer proceeds to step 336. The gear is compared to 60 to determine whether cadence data or gear data is being entered. If a value of 60 or greater is entered, then the computer enters a cadence alarm mode as will be discussed below.

If the gear entered is less than 60, then the gear register "i" is incremented by one in step 322. The value of i is then compared to n, the maximum number of gears, in step 324. If the value is less than n, then the computer returns to step 330 to enter the next gear value. If i is greater than n, then the computer must determine whether the front or rear gears were being entered. The value of n is compared to 8 in step 328. The value of n will be equal to 3 for front gears. If n is equal to 3, then n is set to 8 in step 318, representing the 8 possible gears on the rear freewheel (not shown). The gear register i is then reset to 1 in step 320 in preparation to enter the first rear gear in step 330 and 332 as discussed above.

If in step 328, the value of n was equal to 8, signifying that the rear gears were being entered, then the computer proceeds to step 340 to the cadence entry mode.

Or if in step 336 a value greater than 60 is entered, the computer breaks from the gear entry mode loop and into cadence entry mode, step 340. The value 60 is chosen as a value slightly higher than the largest standard front chainring sold which has 54 teeth.

The computer then proceeds to step 340, which displays the value entered. The value is entered into a first cadence register representing the maximum effective cadence by depressing the MODE button. The computer then proceeds to step 342 to enter the value for the minimum effective cadence value into a second cadence register. The computer then proceeds to step 346 to store all of the gear values and cadence values for use in calculations. In step 348, the calibration mode is ended and the normal display is commenced.

Figure 4:
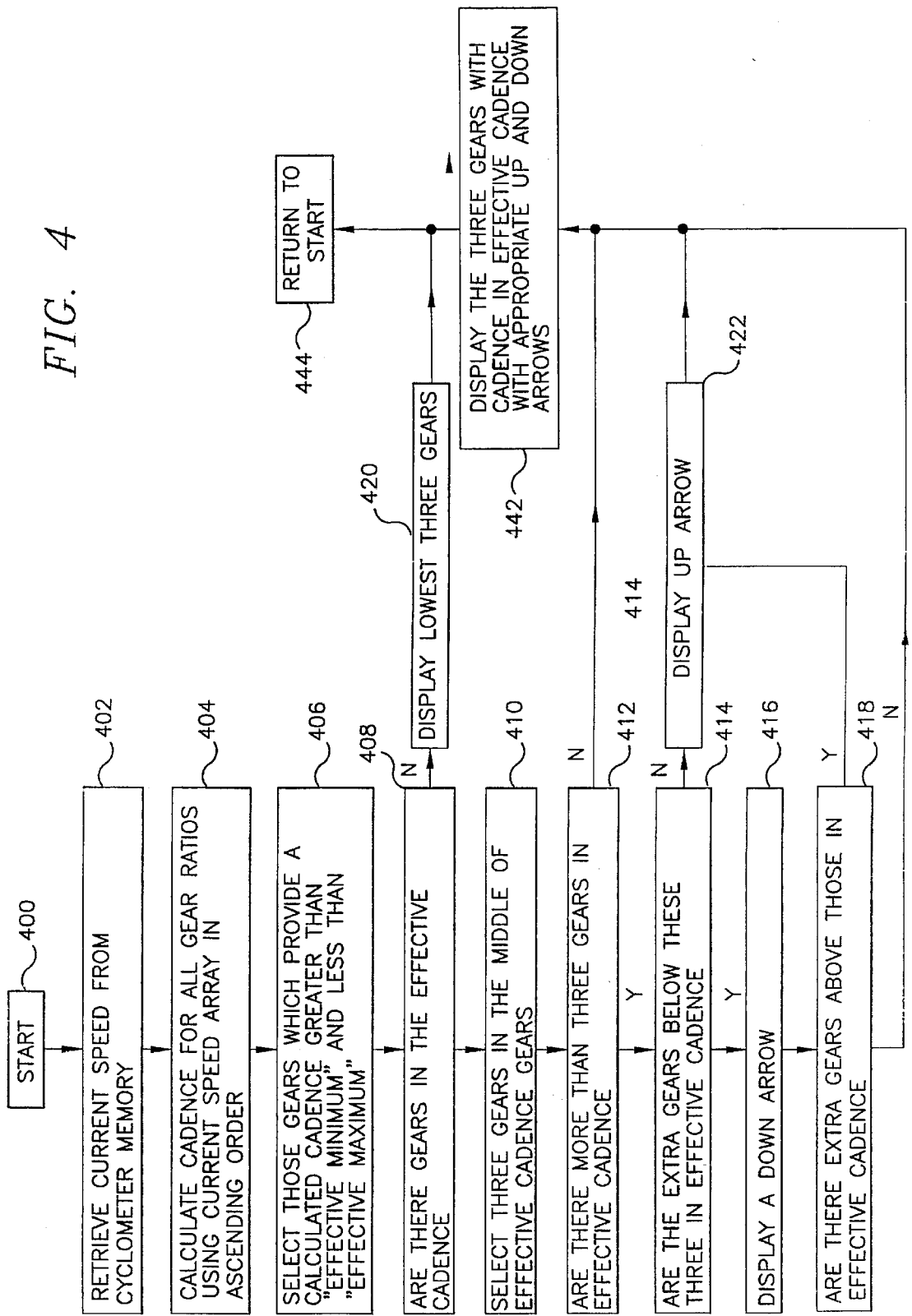
FIG. 4 is a flow diagram showing the iterations performed by the cyclometer computer in displaying the theoretical cadence on the computer display.

Beginning with step 400, FIG. 4 depicts a flow diagram showing the operation of the cadence display in the normal display mode which appears near the bottom right of the computer display. The computer 10 retrieves the current speed v and wheel revolutions per minute from memory in step 402, the calculation of which is discussed supra. The computer proceeds to step 404 to retrieve the front and rear gear values stored in memory. A table is generated showing each possible front and rear gear permutation, and the resulting gear ratio, where the ratio is defined as the number of teeth on the front gear (chainring) divided by the number of teeth on the rear gear (cog). Each gear ratio value in the table is then converted into a theoretical cadence from the current speed. The formula for this conversion is as follows:

$$\begin{aligned} \text{Cadence} &= \text{wheel rpms/gear ratio} \\ &= \text{wheel rpms} * \text{rear gear value/front gear value} \end{aligned}$$

In other words, the cadence, or revolutions per minute of the pedals and the rider's feet is calculated as the number of revolutions per minute of the front wheel (which is theoretically the same as the rear wheel rpms) times the number of teeth on the rear gear divided by the number of teeth on the front gear. With this data calculated and tabulated, the computer can analyze in step 406 how many gear combinations produce a theoretical cadence which is between the minimum and maximum effective cadences.

The computer then must determine which gears to display on the screen. Initially in step 408, the computer determines if any fall within the cadence range. If no gears fall within the range, the computer proceeds to step 420 to display the three smallest gear ratios and their respective cadences. If there is at least one gear combination resulting in a cadence within the range, the computer will select the gears which are closest to the middle of the range in step 412. If less than three gears match, then the gears producing cadences closest to the range are selected until at least three gears are selected. If no gears match the effective range, the three lowest gears and their theoretical cadence values are displayed as flashing values.

Next the computer determines if more than three gears fall within the effective cadence range in step 424. If there are not more than three, then the computer's selection process is complete and the three selected gears (matching or not matching the range are displayed). If there are more than three gears matching the cadence range, then the computer must determine whether a down arrow or an up arrow should be displayed to show the rider that additional gears are available that fall within the effective cadence range.

Step 414 determines whether any of the additional gears producing theoretical cadences falling within the range have a cadence less than the three selected cadences. If not, then an up arrow symbol is initiated by step 422. If there is at least one lower gear, then a down arrow is set in step 416. In step 418, the computer determines if there are also cadence values which fall within the range which are above the three selected cadences. If so, then the computer proceeds to step 422 to display an up arrow in addition to the down arrow to inform the rider that there are gears which produce cadences at the current speed which fall within the preselected effective cadence range. If so, then an up arrow is set in step 422, and proceeds to step 442. If not, the computer proceeds directly to step 442. The computer then displays the three selected cadences, their associated gears, and any appropriate up or down arrows in step 442.

The computer then proceeds to step 444 and begins the process over again. Preferably the cycle is restarted after a certain time lapse to preserve energy requirements of the system, as well as to smooth out the readings by avoiding rapid changes for minute time periods.

Returning to FIG. 1, the rider viewing the computer display 12, will see the three selected cadences in the lower right of the display 20. A symbol "A" or "B" is also shown to inform the rider of the front chainring in which the cadence can be accomplished. The up arrow 22 and down arrow 24 show the rider that the cadences can be scrolled using the start-stop button in the particular direction to show the rider additional cadences.

In this manner, the rider can select and preprogram in a cadence range such as 60 RPM to 90 RPM which represent the most efficient cadence range for the rider to employ. If the rider's cadence is too low, he is exerting too much effort with his legs, resulting in tiring, and a poor performance at the end of the ride. If the rider's cadence is too high, too much loading is placed on the lungs and heart of the rider, possibly causing the rider to enter an anaerobic state. Riding in an anaerobic state where the amount of oxygen entering the rider's bloodstream is insufficient; to support the energy requirements of the rider is inefficient and is only sustainable for brief periods of time. The overall effect; of the overly high cadence is that the rider tires by using up too much of the body's resources without seeing a comparable increase in work output.

A sensor on the computer determines if an optional cadence sensor is installed to provide the rider with additional. information. An add-on enhancement to the computer in the form of actual cadence information is also shown in FIG. 1. An additional. sensor may be located on the chainstay of the bicycle in close communication to a magnet attached to the crankarm of the bicycle. Electrical pulses caused by the magnet crossing the sensor are sent by a cable to the computer and compared to a timer tracking the elapsed time between successive passes of the magnet across the sensor. This information is used similar to the speed calculation to determine the actual cadence or revolutions per minute of the rider's feet. The calculation for the cadence in revolutions per minute (rpm) is as follows:

Actual cadence (rpm)=60/ time elapsed, where the time elapsed is the number of seconds that the crank takes to move one revolution measured as the time between successive passes of the magnet past the sensor.

This information will be displayed when the optional sensor is in place, represented as the cadence CAD 70.A.19. Near the bottom center 26 of the computer display 12, the difference between the actual cadence and the middle effective cadence is displayed, where the middle effective cadence is calculated as the average of the maximum and minimum effective cadence. A positive or negative sign 27 is used to show whether the rider's cadence is above or below the middle effective cadence. In addition, a speaker 28 emits an audible, beeping alarm when the rider has an actual cadence outside of the effective cadence range.

Figure 7:
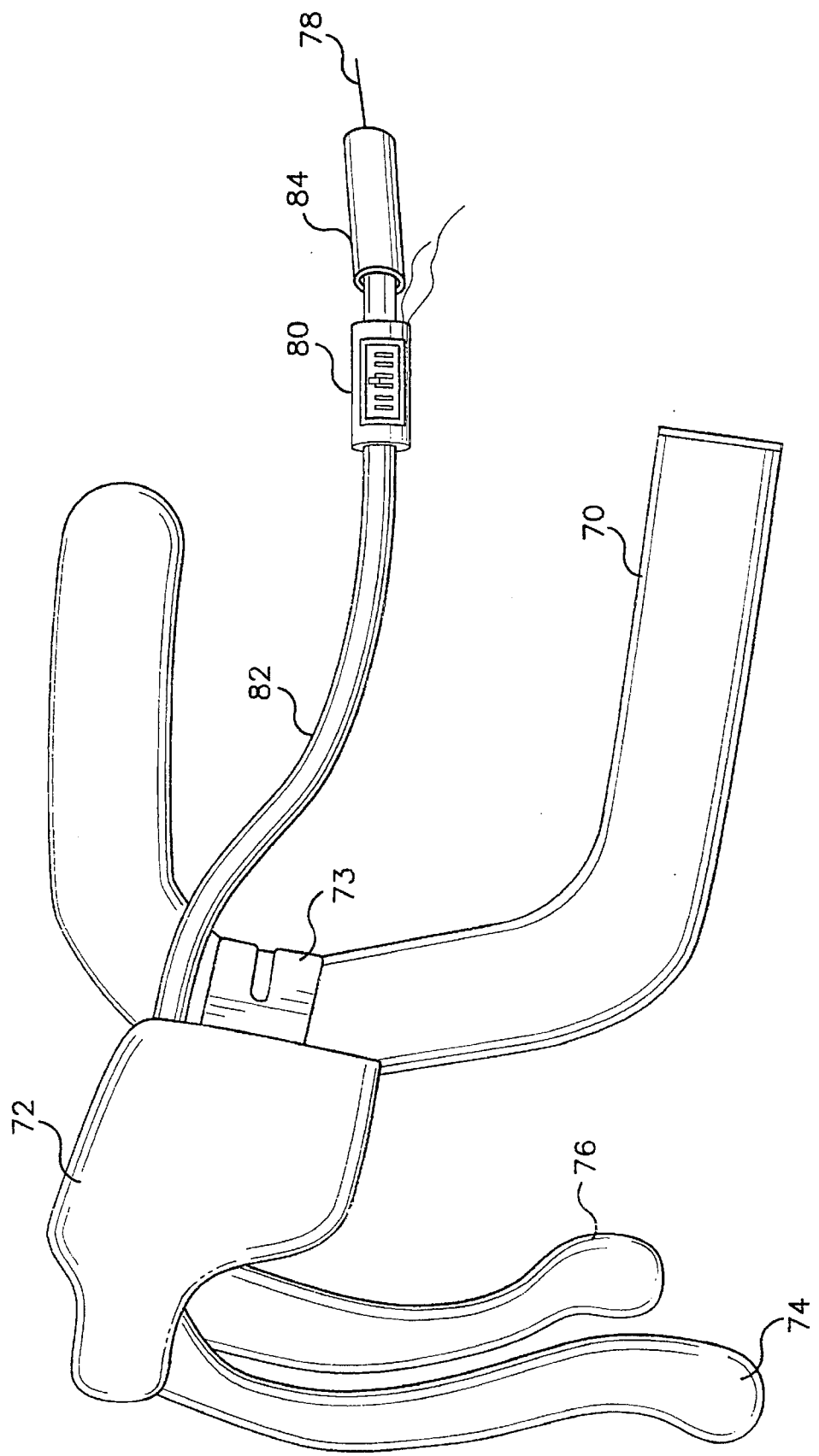
FIG. 7 shows a cable motion sensor for use with the cyclometer of the present invention.

In a second embodiment of the invention, an alternate method of sensing the actual cadence is disclosed. In FIG. 7, a handlebar with a shift sensor according to a second embodiment of the present invention is shown mounted on a bicycle. The handlebar 70 is shown in section with a shift lever/brake lever combination 72 mounted to a front portion of the handlebar by a clamp band 73. This type of shifting and braking lever 72 is well known in the art, available from companies such as SHIMANO and CAMPANGOLO. The front lever 74 tensions a front brake cable (not shown) when the lever is pulled straight back towards the handlebar 70. When the lever 74 is rotated parallel to the handlebar, a ratchet mechanism (not shown) tensions the front derailleur cable 78 to cause a derailleur (not shown) to move in one direction. When the front lever 74 is rotated in conjunction with the rear lever 76, the ratchet mechanism is moved in a reverse direction to release tension on the cable 78 in a well known fashion. A mirror image braking/shifting lever is mounted to the right side of the handlebar (not shown) which controls the rear brake and rear derailleur in a similar manner.

A shift sensor 80 mounted along the derailleur cable 78 between the ends of the cable housing 82 senses motion of the cable 78 within the sensor 80. The cable housing terminates at an existing cable stop welded to the bicycle frame and provides a static frame of reference against which cable travel can be measured. The operation of the cable position sensor is similar to the "OPTICAL GEAR INDICATOR" manufactured by SHIMANO (TM) as shown on page 46 of Bicycling Magazine published December 1994.

By mounting a sensor to the front derailleur cable and mounting another sensor to the rear derailleur cable, electrical signals can be generated and transmitted to the computer representing changes in the selected front or rear gear.

The computer receives the electrical impulse, converts the data according to a calibration chart stored in the computer's memory to a cable distance travelled. This value is then added or subtracted to the previous position of the cable. A cable position calibration table is then used to determine which front and rear gear number the chain is riding on. The computer then converts the gear numbers, A.17, B.19, or other alphanumeric representation of the current gear, to an actual gear ratio according to the stored table entered during the computer calibration as discussed above.

The computer can then use this data to determine the current actual cadence as follows:

Cadence (rpm)   =   wheel rpm * rear gear value/front gear value
                  =   wheel rpm/gear ratio Where wheel rpm is the stored value calculated above, rear gear value is the number of teeth on the rear cog, and front gear value is the number of teeth on the front chainring or other gear size measurement such as diameter which would yield a gear ratio.

This cadence value is then displayed on the computer display 12 as the cadence CAD 70.A.19. In this mode, the number of the front chainring is also displayed, in the example shown in FIG. 1, "A" represents the first chainring shown at 29. Because the actual cadence is calculated with the sensed data, the computer can also display the difference between the actual cadence and the middle of the effective range. In the example shown in FIG. 1, a cadence differential of 10 rpm is shown in the bottom center 26 of the display 12.

Figure 8:
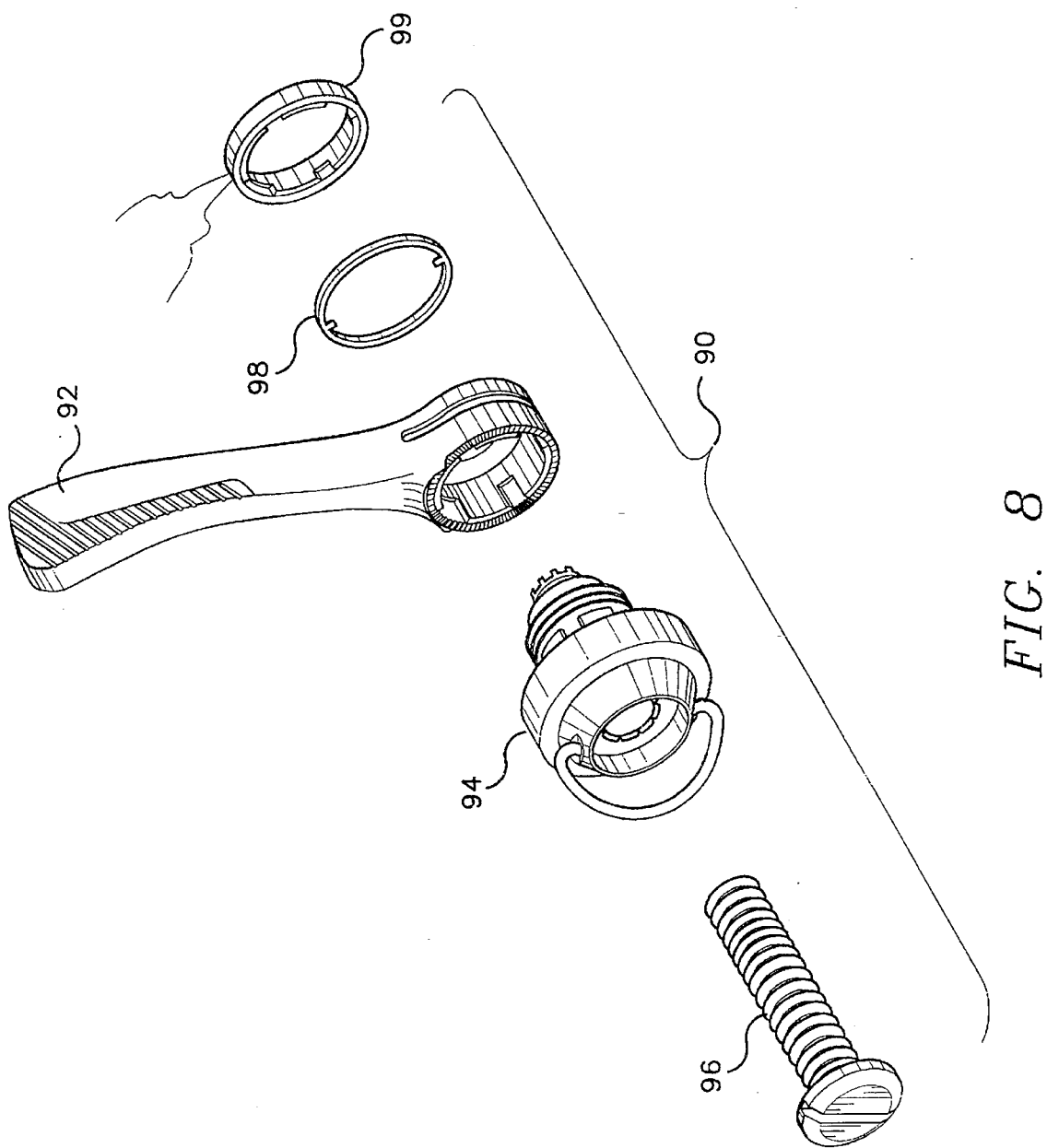
FIG. 8 shows an exploded view of a shifter position sensor for use with the cyclometer of the present invention.
Figure 9:
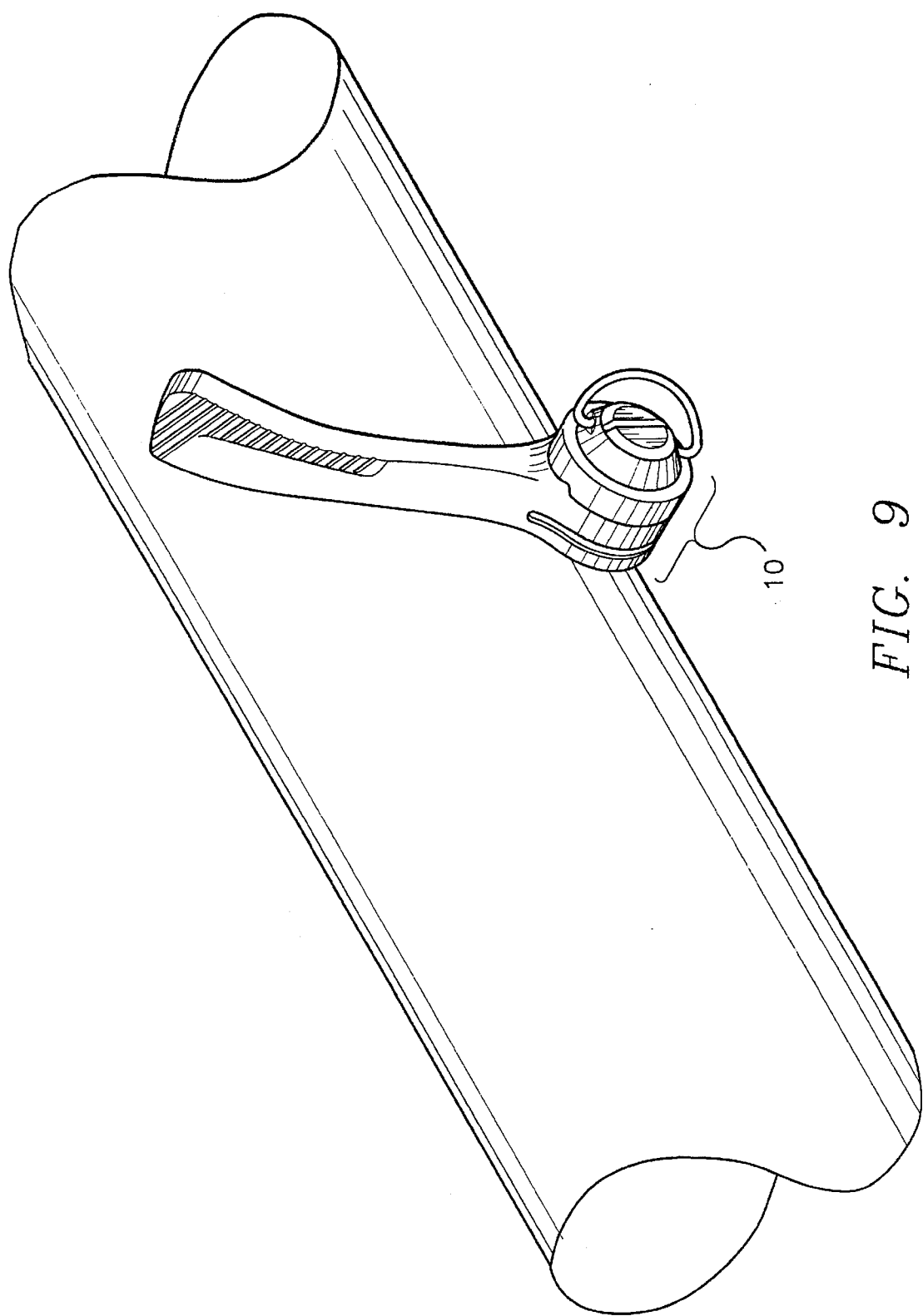
FIG. 9 shows a perspective view of the shifter position sensor of FIG. 8 attached to the down tube of a bicycle.

In accordance with a third embodiment of the cadence sensing mechanism as shown in FIGS. 8, a shift sensor for use with a down tube shifter is shown. The shifter 90 controls one of the two derailleurs in a well known manner by controlling the tension of the derailleur cable linking the shifter to the derailleur (not shown). The shifter 90 typically has a lever 92 attached to an indexing ratchet 94 which controls the number and length of the shifts. A bolt 96 connects the shifting elements and a washer to the frame as shown in FIG. 9.

A shift sensor 99 (FIG. 8) is added according to the third embodiment of the present invention to determine the position of the shifter. The sensor 99 sends an electrical signal to the computer representing the angular change in position of the shift lever. A calibration table converts the current position of the shift lever into a gear number. By using a shift lever sensor on the front and rear shifter, the current front and rear gears on which the chain is riding can be determined, and the current cadence can be calculated from the current wheel rpms and gear ratio table as discussed above. One skilled in the art would appreciate that in addition to an in line cable position sensor similar to that shown, a ratchet/rotation sensor can also be employed with the shift lever/brake lever discussed previously as well as with a handlebar thumb shifter or GRIP SHIFT (TM) shifters.

Figure 6:
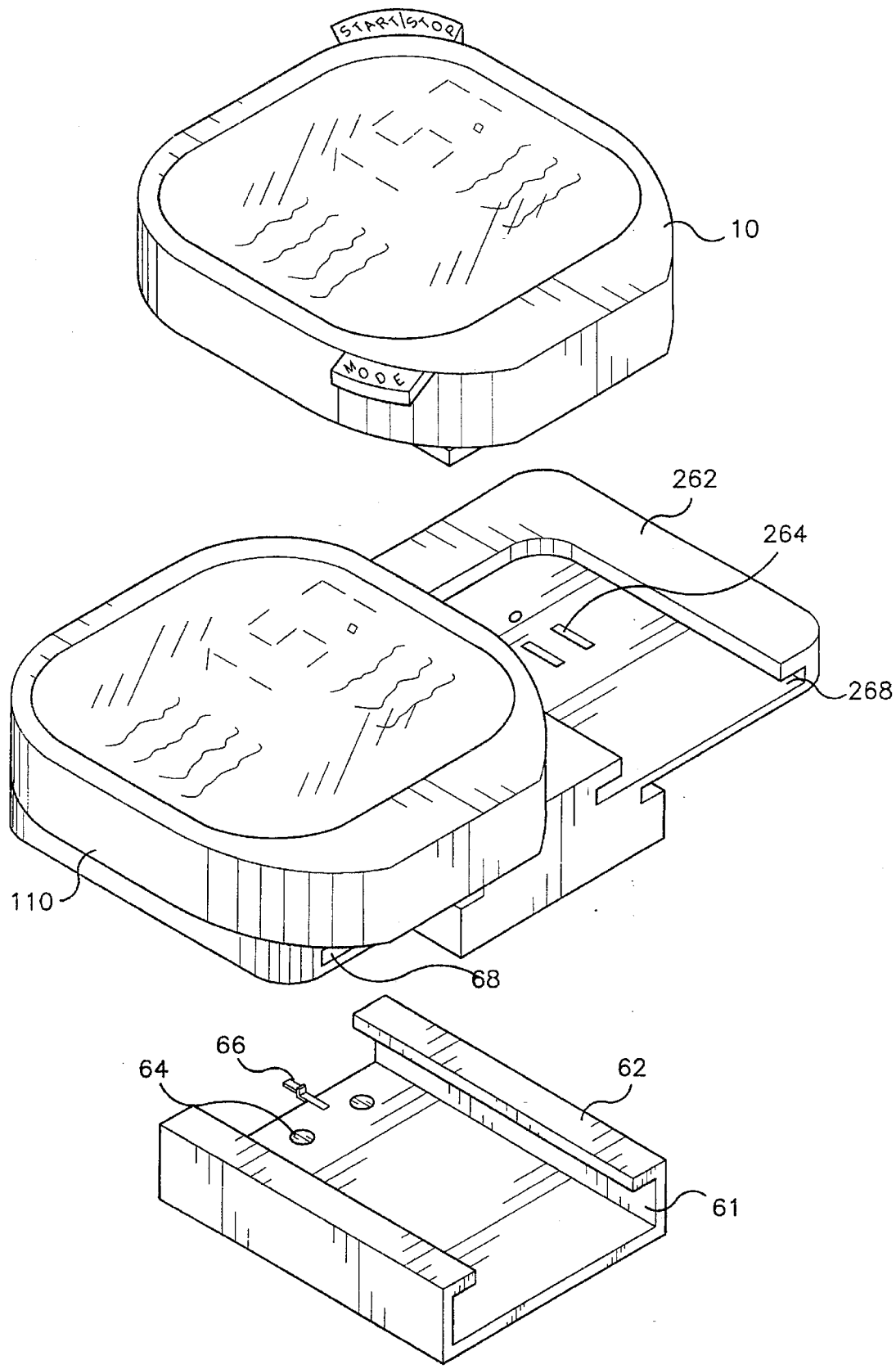
FIG. 6 is an exploded perspective view of the cyclometer computer and a dual converter bracket according to a different embodiment of the invention for installing plural computers onto a single mounting bracket.

Mounting of the computer to the bicycle is also improved according to the present invention. Prior art devices as shown in FIG. 10, were mounted by a clamp band 8 mounted to the handlebar or stem of the bicycle. A bracket 62 as shown in FIG. 6 receives a lower dovetail 68 of the existing computer. Contacts 64 positioned in the base of the bracket 62, integral with the band 8 (FIG. 10), provide communication between the computer and the sensor cable 5 (FIG. 10). A detent 66 provided at one edge of the bracket mates with a depression (not shown) in the existing computer 2 to secure the computer 2 to the bracket.

Figure 5:
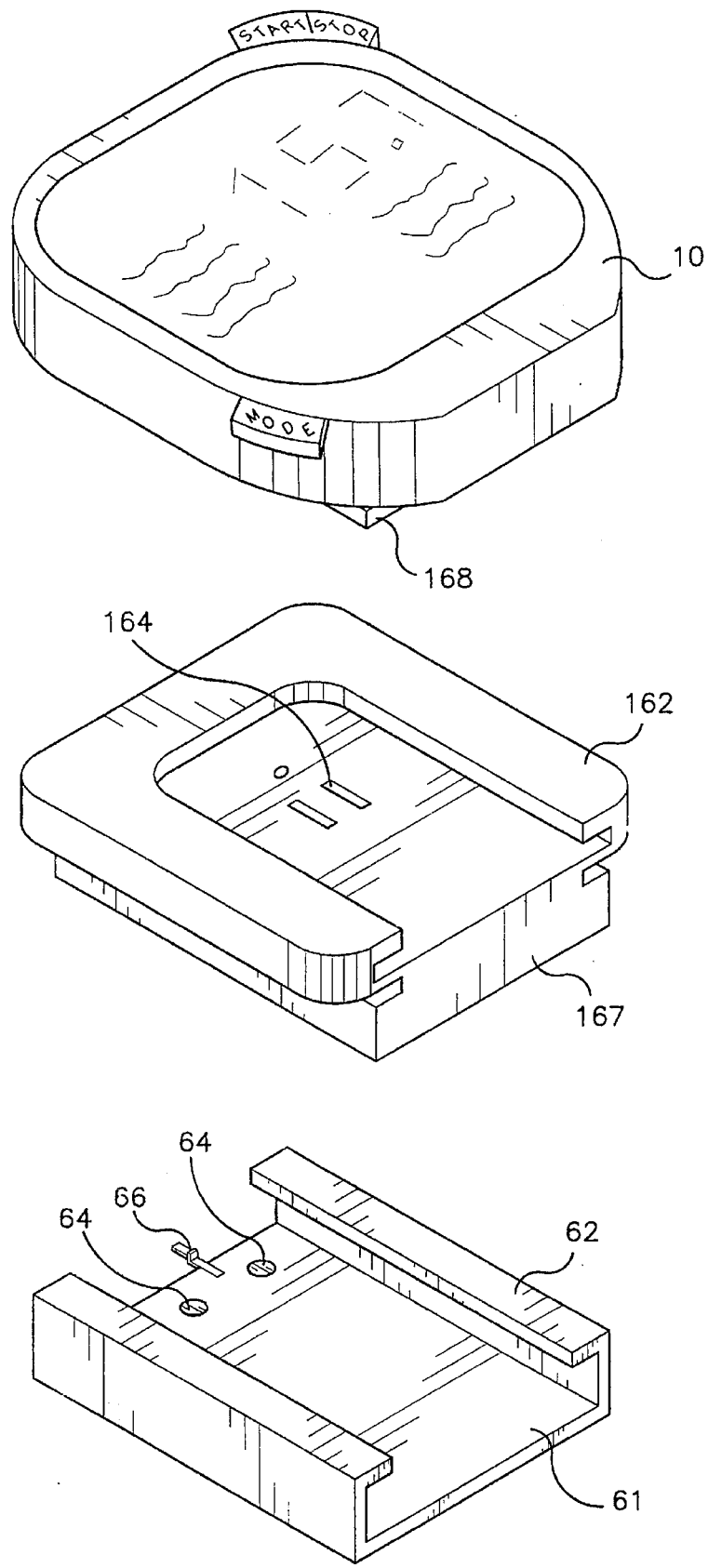
FIG. 5 is an exploded perspective view of the cyclometer computer and a converter bracket according to a different embodiment of the invention for installing the cyclometer onto an existing computer mounting bracket.

According to the present invention, a converter plate 162 as shown in FIG. 5 is provided with a dovetail 167 which mates with a slot 61 in the existing bracket 62. Contacts 164 in the converter plate extend through the bracket and are in electrical communication with the existing contacts 64 when the converter plate 162 is installed on the existing bracket 62. The bottom of the computer 10 according to the present invention is provided with a dovetail 168 which mates with the converter bracket to secure the computer 10 to the bracket 162. This allows the computer 10 to be installed as a replacement to an existing computer and to receive electrical signals from the existing sensor. One skilled in the art would appreciate that the dovetail and slot which have been shown to have a rectangular outer flange, could be made to any convenient shape as long as the dovetail and slot mate securely together.

FIG. 6 shows an alternate embodiment bracket 262 which allows two computers to be installed on the existing bracket 62. A computer according to the current invention 10 is installed on one side of the dual, tandem converter bracket 262 and a separate computer 110 either according to the present invention or the existing computer is mounted on the other side of the bracket. The dovetail slot 268 of the bracket can be dimensioned to receive the dovetail 68 of the computer 110 desired to be mounted on the bracket 262. Contacts 264 provided on each side of the dual converter bracket 262 and connected in parallel to contacts 64 to receive information from the sensor 5. One skilled in the art would recognize that the information received by the computer could include additional sensed information such as from a cadence sensor mounted on the chainstay of the bicycle.

It is to be understood that the present invention is not limited to the embodiments described above, but encompasses any and all embodiments within the scope of the following claims.

I claim:

1. A cyclometer computer display system for a multi-geared bicycle having multiple gear ratios for monitoring and displaying the performance of a rider, comprising:

first sensing means for detecting a revolution of a wheel of the bicycle and for transmitting a pulse signal at the completion of said wheel revolution;

first detecting means in communication with said first sensing means for receiving said pulse signal;

first data calculating means coupled to said detecting means for determining a wheel rotational velocity for the wheel;

first data storage means in communication with said first data calculating means for storing said wheel rotational velocity;

input means for entering multiple gear ratios calculated by dividing front gear sizes by rear gear sizes;

second data storage means for storing the multiple gear ratios of the multi-gear bicycle;

second data calculating means coupled to said first data storage means and said second storage means for calculating a table of theoretical cadence values by dividing said wheel rotational velocity by each of the multiple gear ratios;

third storage means in communication with said second data calculating means for storing said table of theoretical cadence values; and a first display in communication with said third storage means, said first display displaying at least two of said theoretical cadence values of potential gears; whereby a rider may manually select a gear having a desired theoretical cadence from those displayed on said first display.

2. The cyclometer computer display system according to claim 1, wherein said display system displays at least three said theoretical cadence values.

3. The cyclometer computer display system according to claim 1, further comprising a second sensing means for detecting a revolution of a crankarm of the bicycle and for transmitting a pulse signal at the completion of said crankarm revolution.

4. The cyclometer computer display system according to claim 3, further comprising a second detecting means in communication with said second sensing means for receiving said pulse signal;

third calculating means coupled to said detecting means for determining a crankarm rotational velocity;

fourth storage means in communication with said third calculating means for storing said crankarm rotational velocity; and second display means in communication with said fourth storage means and attached to said cyclometer computer display system for displaying said crankarm rotational velocity.

5. The cyclometer computer display system according to claim 4, further comprising a fifth storage means for storing a maximum effective cadence value and minimum effective cadence value;

a fourth data calculating means coupled to said fourth storage means and said fifth storage means for determining if said crankarm rotational velocity is greater than said maximum effective cadence value;

a fifth data calculating means coupled to said fourth storage means and said fifth storage means for determining if said crankarm rotational velocity is less than said minimum effective cadence value; and an alarm in communication with said fourth data calculating means and said fifth data calculating means for alerting the rider when said cadence is greater than said maximum effective cadence value or less than said minimum cadence value.

6. The cyclometer computer display system according to claim 5, wherein said alarm includes a speaker, and said speaker emits an audible signal to alert the rider.

7. The cyclometer computer display system according to claim 5, wherein said alarm comprises a flashing display element.

8. The cyclometer computer display system according to claim 5, further comprising a sixth data calculating means in communication with said fifth storage means for calculating an average effective cadence as an average of said minimum effective cadence and said maximum effective cadence;

sixth data storage means in communication with said sixth data calculating means for storing the average effective cadence;

seventh data calculating means in communication with said fourth data storage means and said sixth data storage means for determining a cadence differential as said average effective cadence minus said crankarm rotational velocity;

seventh data storage means in communication with said seventh data calculating means for storing said cadence differential; and a third display means in communication with said seventh data storage means for displaying said cadence differential.

9. The cyclometer computer display system for a multi-geared bicycle according to claim 1, wherein the bicycle includes at least one shifter connected to a derailleur by a derailleur cable for shifting between gears of the multi-geared bicycle, and the cyclometer computer display system further comprises:

second sensing means for detecting a change in the position of the shifter and for transmitting a signal representing the change in position of the shifter;

second detecting means for receiving said signal;

third data calculating means coupled to said second detecting means for determining a position of the shifter;

a fourth data storage means for storing said position of the shifter;

a fifth data storage means for storing a table correlating an array of shifter positions with an array of gear ratio values;

a fourth data calculating means in communication with said fourth data storage means and said fifth data storage means for determining an actual gear ratio value associated with said position of the shifter;

a sixth data storage means for storing said actual gear ratio value;

a seventh data calculating means communicating with said first data storage means and said sixth data storage means for calculating an actual cadence value by dividing said wheel rotational velocity stored in said first data storage means by said actual gear ratio value;

a seventh data storage means for storing said actual cadence value;

a second display means in communication with said seventh data storage means for displaying said actual cadence value.

10. The cyclometer computer display system according to claim 9, wherein said display unit displays at least three said theoretical cadence values.

11. The cyclometer computer display system according to claim 9, wherein said second sensing means is mounted to the shifter.

12. The cyclometer computer display system according to claim 9, further comprising:

an eighth data storage means for storing a table correlating an array of shifter positions with an array of gear values;

an eighth data calculating means in communication with said fourth data storage means and said fifth data storage means for determining a gear value associated with said position of the shifter;

a ninth data storage means for storing said gear value associated with said position of the shifter; and a third display means for displaying said gear value associated with said position of the shifter.

13. The cyclometer computer display system according to claim 9, wherein said second sensing means is mounted to said derailleur cable and senses movement of said derailleur cable.

14. The cyclometer computer display system according to claim 9, further comprising an eighth storage means for storing a maximum effective cadence value and minimum effective cadence value;

an eighth data calculating means coupled to said seventh storage means and said eighth storage means for determining if said actual cadence value is greater than said maximum effective cadence value;

a ninth data calculating means coupled to said seventh storage means and said eighth storage means for determining if said actual cadence value is less than said minimum effective cadence value; and an alarm in communication with said eighth data calculating means and said ninth data calculating means for alerting the rider when said cadence is greater than said maximum effective cadence value or less than said minimum cadence value.

15. The cyclometer computer display system according to claim 14, wherein said alarm is a speaker and said alarm alerts the rider by emitting a sound.

16. The cyclometer computer display system according to claim 14, further comprising a tenth data calculating means in communication with said eighth storage means for calculating an average effective cadence as an average of said minimum effective cadence and said maximum effective cadence;

ninth data storage means in communication with said tenth data calculating means for storing the average effective cadence;

eleventh data calculating means in communication with said seventh data storage means and said tenth data storage means for determining a cadence differential as said average effective cadence minus said crankarm rotational velocity;

tenth data storage means in communication with said eleventh data calculating means for storing said cadence differential; and a fourth display means in communication with said seventh data storage means for displaying said cadence differential.

17. The cyclometer computer display system according to claim 1, there being means for providing a plurality of readable data in columnar fashion and for displaying less than said plurality of readable data, and user controlled scrolling means for selectively advancing through said plurality of readable data, thus to provide cadence and gear information to the user as desired.

18. The cyclometer computer display system according to claim 1, further comprising a slide bracket with at least two electric contacts therewithin for mounting on the handlebar of the bicycle, a converter bracket, slidingly, matingly interfitted with said slide bracket, a display module, a base provided on and beneath said display module, slidably interfitted with said converter bracket, and electrical connection means for electrically interconnecting said slide bracket electric contacts and said display module.

19. The cyclometer computer display system according to claim 18, said converter bracket further including means for slidably mounting two display module units thereon, one of said units being said display module.

20. A cyclometer comprising:

sensor means for determining rotational velocity of a wheel;

gear size input means for entering sizes of front gears and sizes of rear gears;

cadence limit input means for entering a desired cadence range;

a computer connected to said sensor means, said gear size input means, and said cadence limit input means, said computer including, gear ratio calculation means for determining gear ratios between the sizes of the front gears and the sizes of the rear gears, theoretical cadence calculation means for determining a theoretical cadence value associated with each said gear ratio by dividing the rotational velocity of a wheel by each said gear ratio, and comparison means for determining optimum gear ratios having theoretical cadence values within said desired cadence range; and a display connected to said computer, said display showing at least one theoretical cadence value, front gear size and rear gear size associated with each optimum gear ratio.

* * * * *